Aug. 21, 1956  W. A. YONKERS  2,760,041
SPOT WELDING APPARATUS
Filed Feb. 8, 1954  3 Sheets-Sheet 2
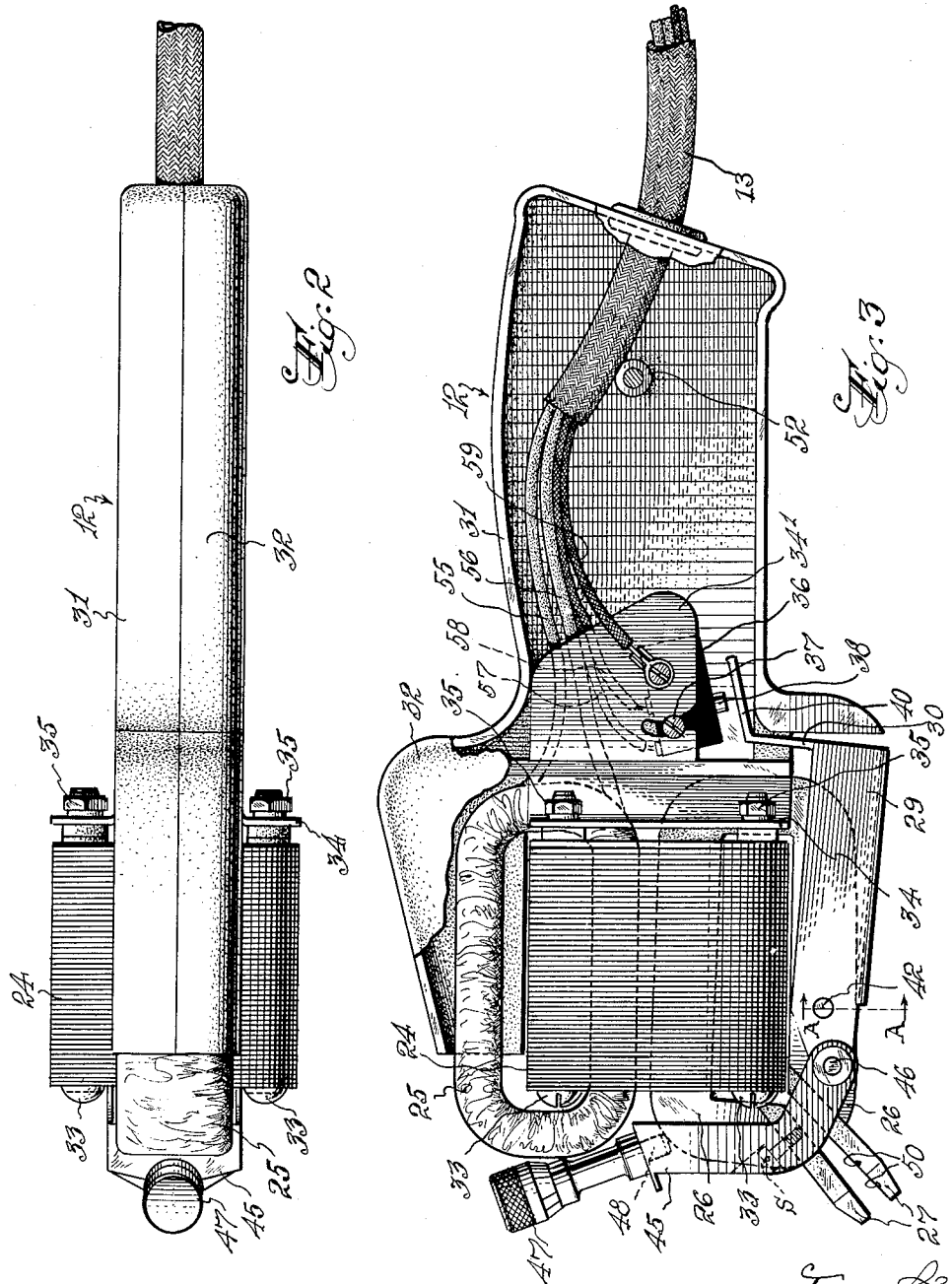
Inventor:
William A. Yonkers
By Gaylor, Cifelli & Jurick
Attorneys.

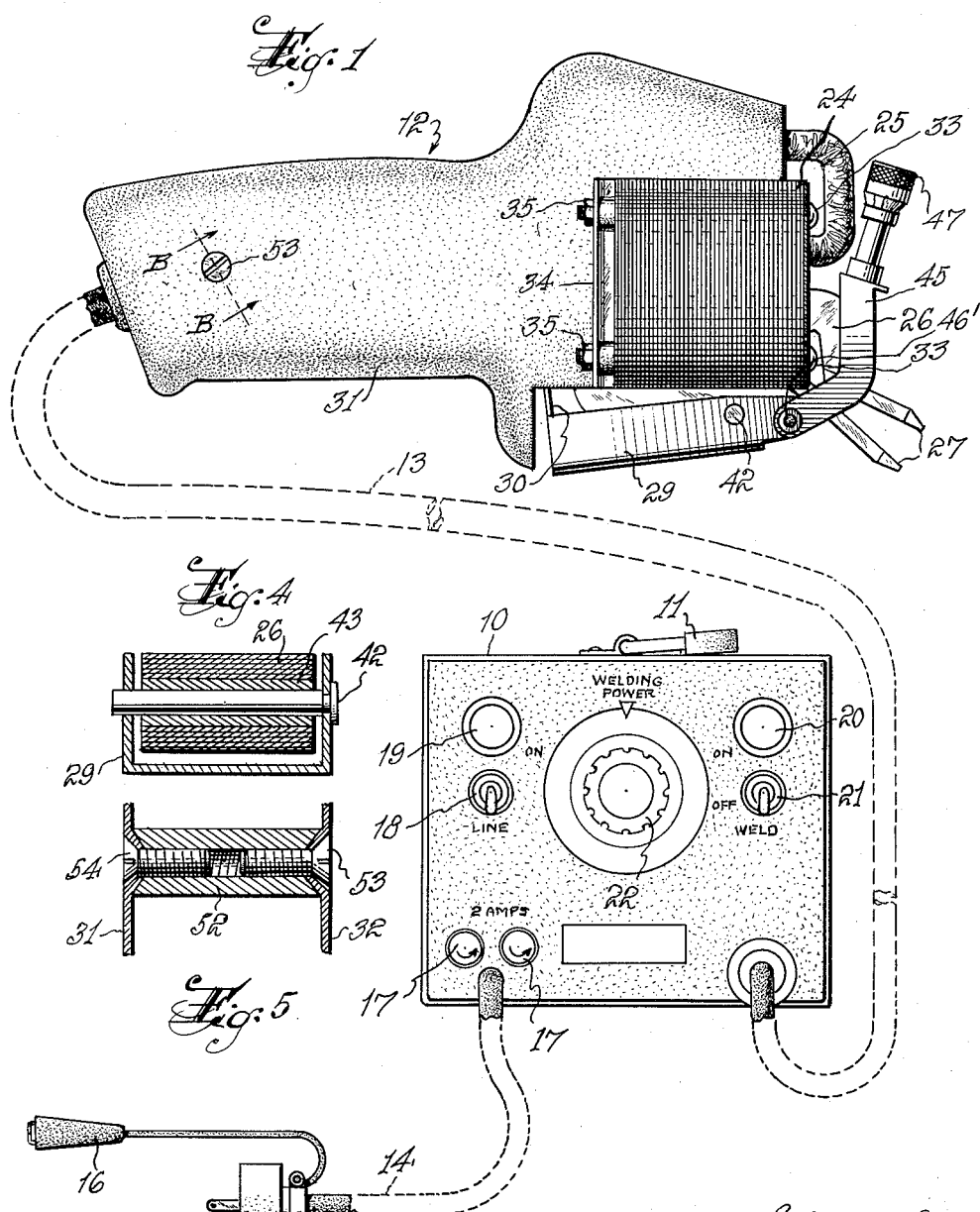

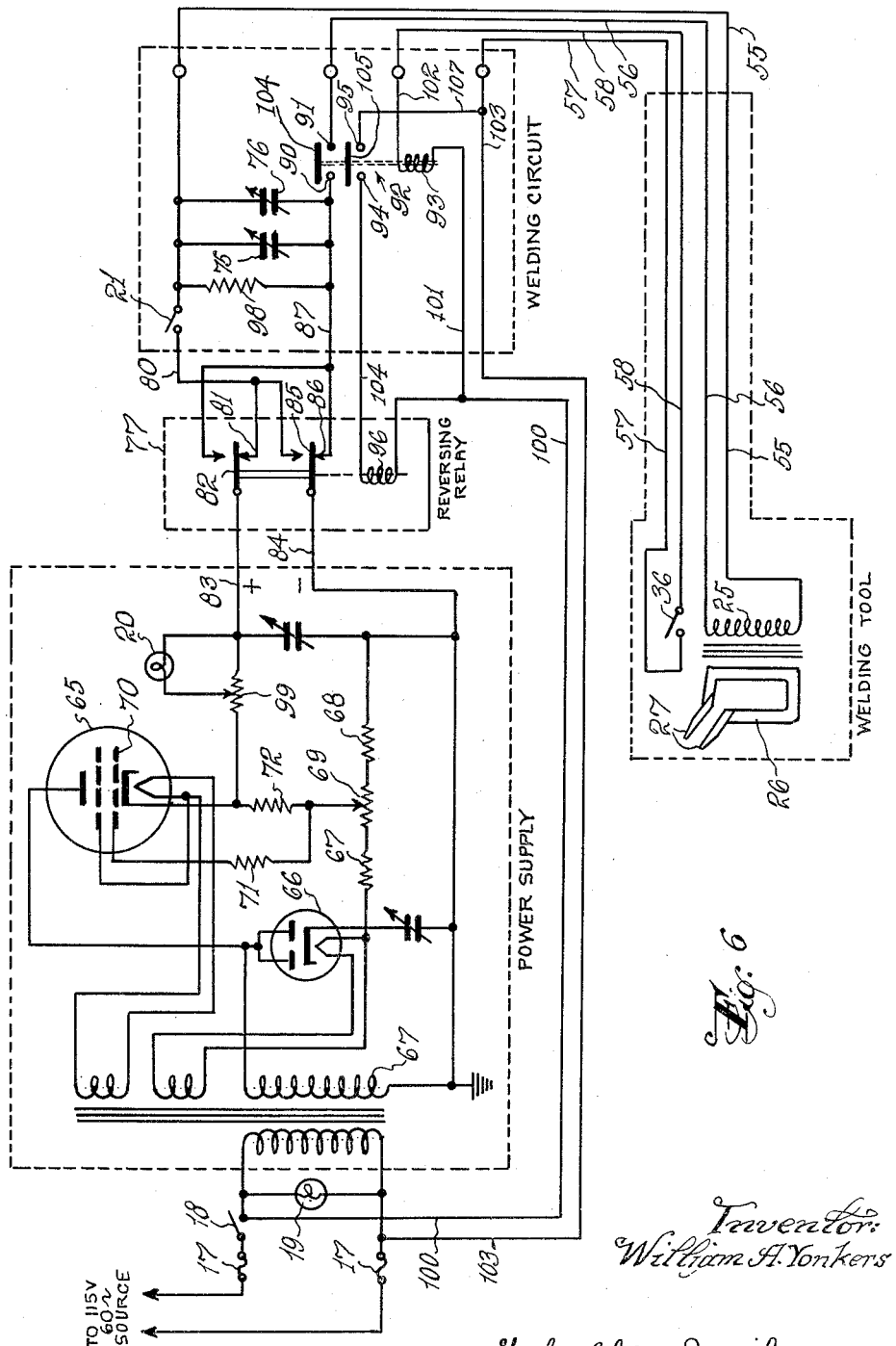

United States Patent Office 2,760,041
Patented Aug. 21, 1956

2,760,041

SPOT WELDING APPARATUS

William A. Yonkers, Mountain Lakes, N. J., assignor to Radio Frequency Laboratories, Inc., Boonton, N. J., a corporation of New Jersey Application February 8, 1954, Serial No. 408,680

8 Claims. (Cl. 219—4)

This invention relates to an improved welding apparatus and more particularly to apparatus for uniting metal parts and including a light weight, portable spot-welding gun.

Generally speaking, spot welding apparatus includes a pair of spaced jaws, or electrodes, capable of carrying a relatively large electric current and between which the parts to be united are placed. The current is caused to flow through the metal parts when such parts are clamped together firmly by the jaws and the heat generated by the current as it flows across the relatively higher resistance of the joint causes a fusion of the two parts at such joint. In adapting a spot welder for use on small, fine work it is desirable, and in many cases essential, that the welder be of small size and light weight. While the invention to be described hereinbelow is adapted for general use, the device shown in the drawings and specifically described is designed especially for use in joining together the connecting wires of electronic equipment such as, for example, radio receiving sets.

An object of this invention is the provision of a spot welding tool of small size, light weight and convenient shape, which may be connected to a source of electrical energy by means of a flexible cable and which is easily manipulated by the use of one hand.

An object of this invention is the provision of an improved spot welding gun having a pistol type grip and trigger by which the gun may be held in and operated by one hand and including electrodes which may visibly be placed on and clamped to the work at the point to be welded.

An object of this invention is the provision of a spot welding gun of simple construction and comprising a pair of spaced, normally-open electrodes forming the jaws for clamping together the parts to be united, a pivoted handle for bringing the jaws together, adjustment means for varying the pressure exerted by the jaws on the parts, a switch operated upon a predetermined movement of the handle to close an electrical discharge circuit whereby an electrical current flows through the jaws, and means applying a follow-up pressure to the jaws after the closure of said switch.

An object of this invention is the provision of a spot welding gun of novel construction and wherein the time the electrical current discharged through the jaws, or electrodes, is adjustably related to the pressure exerted by the jaws upon the parts to be welded together.

An object of this invention is the provision of welding apparatus comprising a source of direct current energy, a welding gun including a transformer having a primary winding and a finger-operable switch for connecting the primary winding to the source of energy, a single turn secondary winding on the transformer and terminating in a pair of jaws adapted to be clamped on the parts to be united, and means operated upon successive closures of said switch to sequentially reverse the polarity of the energy flowing from the said source through the said primary winding.

These and other objects and advantages will become apparent from the following description when taken with the accompanying drawings illustrating the invention. It will be understood the drawings are for purposes of illustration and are not be construed as defining the scope or limits of the invention, reference being had for the latter purpose to the appended claims.

In the drawings wherein like reference characters denote like parts in the several views:

Figure 1 is a view of the complete welding apparatus with the welding gun drawn to an enlarged scale;

Figure 2 is a top view of the welding gun;

Figure 3 is a side view of the welding gun with one of the cover plates removed to show certain internal components;

Figure 4 is a sectional view taken along the line A—A of Figure 3 and drawn to an enlarged scale;

Figure 5 is a sectional view taken along the line B—B of Figure 1 and drawn to an enlarged scale; and Figure 6 is a wiring diagram of the complete apparatus.

Reference is now made to Figure 1 which shows a housing 10, provided with a handle 11, and to which the welding gun 12 is connected by means of a multi-conductor, flexible cable 13. The housing carries the necessary electrical components of the apparatus and is adapted for connection to a conventional 115 volt, 60 cycle source of power by the flexible cable 14 provided with a plug connector 15 and a ground clamp 16. As shown in the drawing, the front panel of the housing carries a pair of readily-accessible fuses 17, a line switch 18, a lamp 19 which indicates when the apparatus is energized from the power source, another lamp 20 which indicates when the apparatus is in condition for performing the welding operation, a switch 21 controlling the connection of the welding gun to its source of power, and a knob 22 which actuates a rheostat to control the amount of power to be fed to the welding gun.

The welding gun is designed to fit conveniently the hand of the user and comprises a stack 24 of transformer laminations, a multi-turn primary winding 25, a single turn, low resistance secondary winding 26 terminating in a pair of normally-spaced jaws, or electrodes, 27 adapted to clamp the parts to be welded together. Such clamping action of the electrodes is controlled by the movement of a pivotally-mounted handle, or trigger, 29 which includes a lever 30 for actuation of an electrical switch to energize the gun.

A better understanding of the construction of the welding gun will be had upon specific reference to Figures 2 and 3. The gun housing comprises a pair of substantially bilaterally-symmetrical cover members 31, 32 of pressed metal and which members are shaped to form a convenient handle, as shown. The transformer laminae are secured together by means of the bolts 33 and nuts 35, the bolts passing through holes provided in the stacked laminae and alined holes formed in the bracket 34. The bracket 34 includes an offset portion 34' to which a micro-switch 36 is adjustably secured by means of the screw 37 passing into a threaded hole in the switch body, it being noted that the screw and switch are positionable at any desired point along the arcuate slot formed in the bracket portion 34'. The purpose of the arcuate slot formation is to maintain the switch-actuating pin 38 substantially normal to the lever arm 40 for all positions of the switch 36. Those skilled in this art will understand that the switch 36 comprises a set of normally-open contacts and which contacts are closed upon a slight inward movement of the actuating pin 38.

As shown in Figure 3, the multi-turn primary winding 25 encircles one leg of the transformer core and the single turn secondary winding 26 encircles the opposite core leg. Such positioning of the windings reduces the overall weight of the welding gun with only a slight sacrifice in operating efficiency brought about by magnetic flux leakage. The secondary winding is formed of a plurality of turns of thin copper ribbon wound on a suitable form to provide a tightly-wound coil. Silver solder is then applied at one corner of the coil so that the coil at this corner and for some distance to each side is, effectively, a solid mass, whereas the remainder of the coil remains of laminated character. Such solid corner of the coil is then cut through to form two, spaced ends and the latter are then milled, or filed, to provide smooth surfaces in substantially radial planes with respect to the coil axis. Each end is provided with two holes having axes which are substantially normal to the end surface whereby fastening screws, such as the screw S, visible in Figure 3, may be inserted through such holes and into alined, threaded holes formed in the associated electrode 27 to thereby draw the electrode tightly to the smooth surface of the coil end. This construction of the secondary coil has several practical advantages. The electrodes are replaceable without dismantling the welding gun, the electrical resistance of the joint between the coil ends and the electrodes is very low, the coil in the vicinity of the electrodes is solid thereby permitting the application of a relatively large clamping force to the work being welded, and the remainder of the coil remains flexible for purposes which will become more apparent as the description proceeds.

The trigger, or operating arm, 29 of the gun comprises a U-shaped, pressed metal member pivotally secured to the outer turn of the secondary coil 33 by a rivet 42. Figure 4, which is a sectional view taken along the line A—A of Figure 3, shows this specific arrangement wherein the bushing 43 is force-fitted into a hole passing through the secondary winding, and the trigger 29 is pivotally attached by means of the rivet 42. Further, a U-shaped bracket arm 45 extends over the exposed portion of the secondary winding and has its ends fastened to the side arms of the trigger 29 by rivets, one such rivet 46 being visible in the showing of Figure 3 and the corresponding, alined rivet 46' being visible in the reverse view of the gun shown in Figure 1. Secured to the base portion of the bracket arm 45 is a micrometer type adjusting screw 47 having an end passing through a clearance hole in such base portion and abutting the secondary coil.

It will be apparent that when the trigger is pivoted in a counterclockwise direction, as when the gun shown in Figure 3 is held in the hand and the trigger is squeezed by the fingers, the bracket arm 45 rotates about the fulcrum formed by the rivet 42 causing the end of the micrometer screw 48 to flex the adjacent end of the secondary winding thereby bringing the electrodes 27 together. If it be assumed that a pair of electrical connecting wires are disposed between the electrodes, the finger pressure exerted upon the trigger will cause the electrodes to exert a progressively increasing pressure upon such wires. At some point, before the extreme limit of rotary movement of the trigger, the lever 40 will depress the operating pin 38 of the microswitch, thereby completing the electrical circuit to the primary coil 25. Such closure of the switch causes a surge of current to flow through the primary coil, thereby inducing a relatively low voltage in the single-turn secondary winding. Since the secondary winding is of relatively very low resistance, a heavy current will flow therethrough, such current being limited primarily by the resistance across the wires to be joined. A spot welding together of the wires takes place. One important feature of the illustrated gun construction resides in the fact that the flexible character of the secondary winding makes it possible to continue the application of an appreciable pressure to the wires being welded together even after closure of the microswitch, thereby not only preventing possible relative displacement of the wires during and immediately after the formation of the weld, but also pressing the wires into a more intimate contact while they are heated by the flow of current through the joint. This results in a quality weld. Further, the amount of pressure to be applied to the wires, prior to the actual welding phase, may be adjusted by a setting of the micrometer screw 47, it being obvious that such screw setting determines the movement or flexing of the adjacent portion of the secondary coil in relation to rotary movement of the trigger. Additionally, the precise point at which the current is caused to flow to form the weld can be adjusted by a setting of the micro-switch relative to the operating lever 40. When the device is to be used for welding together small diameter wires, such as are generally used in connecting electronic components, one or both of the electrodes may be provided with angularly disposed grooves within which the wires may be placed, such groove ends 50 being visible on the lower electrode shown in Figure 3.

From the description given to this point, it will be clear that the operating and functional components of the welding gun form an assembly separate and apart from the cover members 31, 32. These cover members are secured in position individually by means of an internally-threaded stud 52, see Figure 3, and cooperating screws passing through holes in the cover members. Such arrangement is clearly shown in Figure 5, which is a sectional view taken along the line B—B of Figure 1. The internally threaded stud 52 has counter-sunk ends and the cover members 31, 32 are depressed inwardly at the point where the holes are formed to accept the fastening screws 53, 54. Thus, the cover members will be retained in proper fixed position when the screws 53, 54 are tightly threaded into the stud 52.

Returning again to Figure 3, the gun is connected to the cabinet which houses the electrical circuit components by the flexible cable 13, such cable being made up of five conductors. Two conductors 55, 56 are connected to the ends of the primary winding 25, two conductors 57, 58 are connected to the normally-open contacts of the micro-switch 36 and the conductor 59 is connected to the bracket portion 34'. The other end of the conductor 59 is connected to the ground clamp 16, see Figure 1, thereby grounding the gun for purposes of safety.

Having now described the construction of the apparatus, particularly the welding gun, reference is made to Figure 6 which is a wiring diagram of the complete apparatus. The power supply section comprises a half-wave grid controlled rectifier utilizing a type 2050 Thyratron tube 65 and a rectifier tube 66, type 6 x 4, the latter rectifying the output of the transformer secondary winding 67 and supplying a reference voltage to a voltage divider circuit consisting of the fixed resistors 67, 68 and the potentiometer 69. The potentiometer 69, which is adjustable by the operator by means of the control knob 22 shown in Figure 1, permits the reference voltage to be varied from 350–600 volts, such reference voltage being applied to the grid 70, of the tube 65, through the resistor 71 and to the cathode of such tube through the resistor 72.

The rectified output voltage of the power supply is applied across a pair of 50 microfarad, oil-filled capacitors 75, 76 through the contacts of a ratchet type, reversing relay 77 upon closure of the switch 21. As shown in the drawing, a closure of the switch 21 connects the upper terminals of the capacitors to the plus (+) side of the power supply output through the circuit comprising the lead 80, the closed contacts 81, 82 of the reversing relay and lead 83. The negative side of the power supply output is connected to the lower ends of the capacitors through the lead 84, the closed contacts 85, 86 of the reversing relay and the lead 87. Consequently, the capacitors will be charged to a potential which depends upon the setting of the potentiometer 69. When the voltage applied to the cathode of the tube 65 exceeds the reference voltage established by the particular setting of the potentiometer 69, as the capacitors 75, 76 charge, the grid of the tube 65 becomes negative by reason of the voltage drop across the resistor 72. This cuts off the rectifier tube 66 from which it becomes apparent that the circuit is self-regulating to maintain the maximum charging voltage across the capacitors constant and equal to the reference voltage.

The discharge of the capacitors 75, 76 is controlled by the closure of the contacts 90, 91 of a mercury relay 92 having an operating coil 93 energized upon closure of the contacts of the micro-switch 36 which is located in the welding gun as will be described in more detail hereinbelow when a complete operating cycle is explained. At the moment I wish to point out that the mercury relay also includes a second set of contacts 94, 95 the closure of which energizes the operating coil 96 of the reversing relay. Thus, each time the mercury relay is operated to discharge the capacitors 75, 76 through the primary winding 25 of the gun, the reversing relay 77 is momentarily energized to reverse the polarity of the charging voltage impressed across the capacitors 75, 76. Such reversal of the charging potential is desirable to obtain a maximum energy transformation per pound of iron for each weld by driving the iron in the gun transformer from the value of the residual magnetism of the previous welding cycle to saturation in the opposite direction on the hysteresis curve.

The shunting resistor 98 bleeds off the energy stored in the capacitors when the apparatus is turned off, the resistor 71 serves as a grid-limiting resistor and the center-tapped resistor 99 limits the charging current from the tube 65. The charging lamp 20, see also Figure 1, is connected across the resistor 99 and indicates the flow of charging current to the capacitors. When the capacitors are charging this lamp will be energized to warn the operator accordingly. When the capacitors are fully charged, the lamp will be "out," thereby indicating that the apparatus is ready for welding. The lamp 19, on the other hand, indicates when the apparatus is connected to the power line and the fuses 17 prevent possible damage to the equipment when the trigger of the welding gun is held depressed for a prolonged period of time. As has already been explained, the lamp 19 and the charging lamp 20, the line switch 18 and the charging circuit switch 21, the fuses 17, and the control knob for setting the charging potential, are all mounted on and available from the front panel of the cabinet housing the electrical components and circuitry.

An operating cycle of the apparatus will now be described with particular reference to Figure 6. The operator sets the potentiometer 69 to a preselected value by rotation of the knob 22 (Figure 1) relative to a suitably marked scale. Such setting is determined primarily from experience with consideration given to the size and nature of the parts to be welded and the character of the weld desired. The apparatus is then energized by closure of the line switch 18 which also energizes the power lamp 19. As the capacitors 75, 76 are being charged, in a direction depending upon the relative positions of the reversing relay contacts, the flow of charging current through the resistor 99 creates a voltage drop across the charging lamp 20 whereby such lamp remains lighted until the capacitors are fully charged. As the operator now squeezes the trigger of the welding gun, the electrodes 17 clamp the parts to be welded and further movement of the trigger closes the micro-switch 36. Such closure of the switch 36 connects the operating coil 93 of the mercury relay 92 across the 115 volt, 60 cycle power line, the circuit being traceable as follows: the wire 100, wire 101, operating coil 93, wire 102, cable lead 58, micro-switch 36, cable lead 57, and wire 103 back to the other side of the power line. Energization of the operating coil of the mercury relay causes the two, insulated movable contacts 104 and 105 to close the respectively associated stationary contacts 90, 91 and 94, 95. Closure of the contacts 90, 91 causes the energy stored in the capacitors 75, 76 to be discharged into the primary winding 25 of the welding gun, through the cable leads 55, 56 which induces a voltage in the single-turn, low resistance secondary coil 26, thereby spot welding together the parts clamped between the electrode jaws 27. The simultaneous closure of the mercury relay contacts 94, 95 connects the operating coil of the reversing relay across the 115 volt power line, the circuit being traceable as follows: wire 100, operating coil 96, wire 104, closed contacts 94, 95, wire 107 and wire 103 back to the other side of the power line. When the reversing relay coil is energized the movable contacts 82 and 85 are moved out of engagement with the associated lower stationary contacts 81, 86 and into engagement with the associated upper stationary contacts, thereby reversing the polarity of the charging voltage across the capacitors 75, 76, as is believed to be apparent. The welding operation having been completed, the release of the operator's finger pressure upon the gun trigger results in the opening of the micro-switch 36, thereby de-energizing the coil 93 of the mercury relay whereby the movable contacts of the latter return to the normal position shown in the drawing. The next welding cycle is a repetition of that just described with the exception that the reversing relay contacts are returned to the position shown in the drawing, it being again pointed out that the reversing relay is of the ratchet type wherein the movable contacts are thrown first in one direction and then the other, alternately, upon sequential closures of the mercury relay contacts 94, 95. The time required to fully charge the capacitors will determine the speed with which welds may be made and such time factor is, of course, dependent upon the circuit constants. In any event, the operator knows that the capacitors are not fully charged until the lamp 20 is "out," thereby eliminating the possibility of poor quality welds. As a matter of fact, the lamp 20 also serves to indicate faulty operation of the welding gun and/or component failure in the charging circuit. Actually, if the lamp continues to glow for more than three (3) seconds after a weld has been formed, a component of the equipment has failed or the trigger of the gun is being held down. The switch 21, in the charging circuit, permits isolation of the welding circuit, including the gun, while equipment adjustments are made.

From the above description of the construction and operation of the apparatus, it is apparent that I provide welding apparatus having certain highly desirable features and advantages. The welding gun is of small size and convenient shape so that it can be operated with one hand. Actually, the total weight of the gun is only 2½ pounds. The design of the gun permits the use of long, pointed, electrodes, thereby facilitating the use of the device in welding together wires in electronic equipment. The described formation of the single-turn multi-layer secondary winding provides a maximum of flexibility of the bulk of the coil while yet permitting ready replacement of the electrodes. Such coil flexibility permits the continued application of an increasing pressure on the work during and after the actual welding operation. Still further, the adjustment feature provided by the micrometer type screw, permits a fine control of the welding pressure and the adjustable mounting of the micro-switch affords a setting of a precise relationship between the pressure applied to the work and the actual point of discharge of the capacitors to thereby adjust the device in accordance with the nature and characteristics of the particular work. With respect to the electronic circuit, the sequential reversal of the voltage applied to charge the capacitors promotes a maximum operating efficiency. All these features are conducive to the repeated formation of quality welds.

Having now given a detailed description of my invention in accordance with the patent statutes, those skilled in this art will find no difficulty in making certain changes and variations in the individual components and their related assembly as may be dictated by specific requirements.

Such changes and modifications may be made without departing from the spirit and scope of the invention as set forth in the following claims.

I claim:

1. A spot welding gun comprising a housing carrying a transformer having a multi-turn, primary winding on one core leg and a single-turn, flexible secondary coil on the opposite core leg, said secondary coil terminating in a pair of normally-spaced, cooperating electrodes extending outwardly of the housing; a finger-operable lever pivotally attached to the secondary winding; a bracket member secured to the lever at a point between one of the electrodes and the pivot axis of the lever; means carried by the bracket member and effective upon pivotal movement of the lever to engage the outer surface of the secondary coil at a point spaced from the other of said electrodes and to flex the secondary coil to reduce the spacing between the electrodes; a normally-open switch disposed within the housing and means carried by the lever to close said switch upon a predetermined pivotal movement of the lever.

2. A spot welding gun comprising a housing; a substantially rectangular core at one end of the housing; a multi-turn primary winding encircling one leg of the core; a single-turn secondary coil encircling the opposite leg of the core, said coil being formed of a plurality of closely wound convolutions of conducting ribbon which are cut through at one corner to form spaced ends; a pair of cooperating, normally-spaced electrodes secured to the ends of the secondary coil and extending outwardly of the housing; a U-shaped, finger-operable lever disposed over one long side of the secondary coil and including a switch-operating arm; means pivotally securing the said lever to the said one long side of the coil; a bracket member secured to an end of said lever; a coil-flexing member carried by the bracket member and adapted to engage the outer surface of the secondary coil at a corner adjacent to that carrying the electrodes; and an electrical switch disposed within the housing, said switch having a pair of normally-open contacts adapted for closure by the switch-operating arm upon a predetermined pivotal movement of the said lever.

3. The invention as recited in claim 2, wherein the said switch includes a contact-operating pin and including means adjustably mounting the switch within the housing to space the said pin a predetermined distance from the switch-operating arm when the lever is in its normal position.

4. The invention as recited in claim 2, wherein the bracket member is substantially U-shaped having spaced side arms spanning a short side of the secondary coil; the ends of said side arms are secured to the said lever, and the said coil-flexing member is carried by the base of the bracket member.

5. The invention as recited in claim 4, wherein the coil-flexing member comprises a micrometer type screw having an end passing through an opening in the base of the bracket member.

6. The invention as recited in claim 2, wherein each one of the electrodes is removably secured to the end of the secondary coil by screws passing through holes formed in the coil end, said screws having axes normal to the plane of the coil end and passing into threaded holes formed in the electrode.

7. In a spot welding gun of the type comprising a single-turn coil magnetically coupled to a multi-turn primary winding, a pair of electrodes for clamping the work to be welded and a finger-operable handle adapted upon movement to bring the electrodes together and to complete an electrical circuit through the primary winding; the improvement wherein the secondary coil is cut through in a plane substantially radial to the coil axis, the electrodes are removably secured directly to the coil ends, and the finger-operable handle is pivotally secured to the said coil.

8. A single-turn, flexible coil for use in a spot welding gun, said coil being formed by a plurality of closely-wound convolutions of copper ribbon and cut through along a transverse plane substantially radial to the coil axis, to form a pair of spaced coil ends, silver solder securing together adjacent ribbon convolutions at such coil ends, and a pair of electrodes secured to the coil ends by screws, said screws passing through clearance holes formed in the coil ends and into alined, threaded holes in the associated electrode and said screws having axes substantially normal to the surface of the coil end.

References Cited in the file of this patent

UNITED STATES PATENTS

| | | |
|---|---|---|
| 1,084,083 | Gravell | Jan. 13, 1914 |
| 1,086,041 | Gravell | Feb. 3, 1914 |
| 1,986,512 | Meadowcroft | Jan. 1, 1935 |
| 2,148,095 | Yettner | Feb. 21, 1939 |
| 2,295,293 | Rogers | Sept. 8, 1942 |
| 2,462,458 | Beymer | Feb. 22, 1949 |
| 2,502,887 | Rava | Apr. 4, 1950 |
| 2,508,708 | Dawson | May 23, 1950 |